United States Patent [19]
Ohkawa

[11] Patent Number: 5,486,337
[45] Date of Patent: Jan. 23, 1996

[54] DEVICE FOR ELECTROSTATIC MANIPULATION OF DROPLETS

[75] Inventor: Tihiro Ohkawa, La Jolla, Calif.

[73] Assignee: General Atomics, San Diego, Calif.

[21] Appl. No.: 198,947

[22] Filed: Feb. 18, 1994

[51] Int. Cl.⁶ .............................. G01N 1/28; G01N 1/38
[52] U.S. Cl. ..................... 422/100; 436/180; 239/690
[58] Field of Search ................... 422/100; 436/180; 239/690

[56] References Cited

U.S. PATENT DOCUMENTS

| | | |
|---|---|---|
| 3,815,000 | 6/1974 | Phillips et al. . |
| 3,872,361 | 3/1975 | Masuda .............................. 317/262 E |
| 4,302,313 | 11/1981 | Columbus .............................. 204/195 R |
| 4,316,233 | 2/1982 | Chato et al. . |
| 4,376,031 | 3/1983 | Andrus et al. . |
| 4,414,197 | 11/1983 | Dussault . |
| 4,465,582 | 8/1984 | Richman . |
| 4,634,057 | 1/1987 | Coffee et al. . |
| 4,688,141 | 8/1987 | Bernard et al. . |
| 4,700,262 | 10/1987 | Inculet . |
| 4,702,814 | 10/1987 | Audeh . |
| 4,737,251 | 4/1988 | Carle et al. . |
| 4,749,458 | 6/1988 | Muroi et al. . |
| 5,001,594 | 3/1991 | Bobbio . |
| 5,015,906 | 5/1991 | Cho et al. . |
| 5,072,288 | 12/1991 | MacDonald et al. . |
| 5,090,643 | 2/1992 | Spears . |
| 5,180,288 | 1/1993 | Richter et al. . |

Primary Examiner—Jeffrey R. Snay
Attorney, Agent, or Firm—Nydegger & Associates

[57] ABSTRACT

A method and apparatus are disclosed for manipulation of very small droplets of liquid, by placing the droplets on wettable positioning electrodes on a non-wettable substrate, applying voltages to the positioning electrodes to electrostatically charge the droplets, and applying voltages of opposite polarity to target electrodes, thereby attracting the droplets from the positioning electrodes toward the target electrodes. The electrodes can be on a manipulation surface or on a separate portable dispensing tool or pickup tool.

7 Claims, 2 Drawing Sheets

DEVICE FOR ELECTROSTATIC MANIPULATION OF DROPLETS

TECHNICAL FIELD

The present invention is in the field of handling samples of liquid for analysis, reaction, or other treatment. In particular, the invention is in the field of manipulation of very small samples of the liquid in the form of minute droplets.

BACKGROUND OF THE INVENTION

Tests in biology are moving from the use of a relatively limited number of relatively large samples toward automated mass production tests on a large number of relatively small samples. This results from the simultaneous analysis of a large number of parameters, such as a large number of statistical samples obtained, or a large number of reagents. Some testing being conducted requires a very high number of individual samples, and some sample material is very scarce or very expensive. High density titre plates are currently known which arrange a number of small vessels as desired for the test at hand, with each small vessel containing a small sample. The titre plate is manipulated so as to provide access to the desired sample, or separate means are used to access the desired sample while the titre plate remains stationary. Control of the movement of the plate or the separate access means can be by computer, for the sake of speed and accuracy.

It has been recognized that in some areas, even such high density titre plates will require larger amounts of sample material than will be readily or economically available. It would be desirable, therefore, to be able to conduct testing on an extremely large number of extremely small samples. The desired sample size would be in the range of 0.1 to 50 nanoliters ($10^{31\ 9}$ liter). Such minute volumes are frequently called nanovolumes. Previously known titre plates will not efficiently handle such minute volumes, because the sample vessels would make handling of the samples very difficult or impossible. In addition, currently known means of moving a sample from one location to another location for analysis or treatment would be inadequate for the accurate and non-destructive handling of nanovolumes.

It is therefore an object of the present invention to provide a method and apparatus for manipulating a large number of nanovolume samples for analysis or treatment, while conserving the sample material. It is a further object of the present invention to provide a test surface apparatus on which a large number of nanovolume samples can be accurately placed, and on which the samples can be moved about accurately and conservatively, for the purpose of analysis or treatment. It is a still further object of the present invention to provide an apparatus for conservative generation and accurate dispensing of nanovolume samples onto a test surface. It is a yet further object of the present invention to provide an apparatus for accurate and conservative picking up of nanovolume samples from a test surface. It is a still further object of the present invention to provide a method and an apparatus for manipulation of nanovolume samples, which are easy and economical to implement.

SUMMARY OF THE INVENTION

The present invention pertains to an apparatus for transporting minute, nanovolume sized liquid droplets from one point to another for analysis, detection, or reaction with other droplets. In this invention, electrostatic forces are generated and controlled to move the droplets as required, and with very little if any loss in volume.

As exemplified by the preferred embodiment, the present invention includes a substrate in the form of a plate, having a large number of electrodes imbedded in, or otherwise mounted, on the substrate. The electrodes are arranged in a pattern specifically suited to the intended use of the device, such as for analysis or for mixing. The substrate is made of polytetrafluoroethene or some other non-wettable material. As used herein, the term "wettable" refers to the quality of having a relatively high force of adhesion between a liquid and a surface, compared to the surface tension within the liquid, so that the liquid will adhere to, or "wet" the surface rather than forming droplets on the surface. A "non-wettable" surface, relative to a given liquid, is one on which the liquid forms droplets and does not tightly adhere.

The electrodes are made of an electrically conductive material which is wettable by the liquid to be handled. Each electrode is a metallic disc approximately 10 µm in diameter. Each electrode is spaced approximately 100 µm from the adjacent discs. Each electrode is connected to a voltage source which is controlled by a computer. The computer can cause the voltage source to impose a selected voltage on each electrode, of a selected polarity and magnitude, relative to another electrode. The computer can change the polarity and magnitude of the voltage on each electrode individually.

Liquid droplets are placed on certain of the electrodes, with each droplet having a size as small as the range of 0.1 to 50 nanoliters. The droplets will adhere to the electrodes, rather than flowing to the substrate, because the electrodes are made of a wettable material, while the substrate is non-wettable. In order to move a particular droplet from the electrode it occupies, which can be called the positioning electrode, to another electrode, which can be called the target electrode, the positioning electrode is first subjected to a selected voltage. This results in the capacitive charging of the droplet with the same polarity as the positioning electrode.

Subsequently, the target electrode, usually located adjacent to the positioning electrode to serve as a means of attracting the droplet from the positioning electrode, is subjected to a voltage of opposite polarity to the positioning electrode, and the voltage on the positioning electrode is increased in magnitude. This creates a force urging the droplet toward the target electrode. When the voltage between the electrodes is sufficiently high, relative to the mass of the droplet and the force of adherence of the droplet to the positioning electrode surface, the droplet will leave the positioning electrode and move to the target electrode. The droplet will then lose its electrostatic charge to the target electrode.

After the droplet is relocated as described above, it can be analyzed, treated, or otherwise dealt with as desired. If further movement is desired, the droplet can be moved again through the same process, except that the electrode to which the droplet has been repositioned now becomes the positioning electrode, and some other electrode is the new target electrode. If mixing of droplets is desired, the target electrode can initially be occupied by a second droplet, or the target electrode can be the target for two droplets from two different positioning electrodes.

It is also possible to deposit a droplet on the substrate or remove the droplet from the substrate by a variation of the above method, using a second or third embodiment of the present invention. In both the second and third embodiments, the substrate is tubular in shape. The second embodiment consists of a tubular dispensing implement having a primary electrode which charges a quantity of liquid in the tube. Secondary electrodes spaced along the outside of the tube pull a droplet away from the primary electrode and transport the droplet along the tube toward its open end. The third embodiment consists of a tubular pickup tool which has a diameter approximately the same as the diameter of the droplet. The pickup tool has a wettable surface on its inside diameter and an electrode on its outside diameter. The pickup tool is maneuvered near the droplet to be picked up from the substrate, and the same method described above is followed. The electrode on the pickup tool functions the same as the aforementioned target electrode, except that the droplet is drawn into the interior of the tube, to contact the wettable surface therein, rather than contacting the electrode.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF PREFERRED EMBODIMENTS

Figure 1:
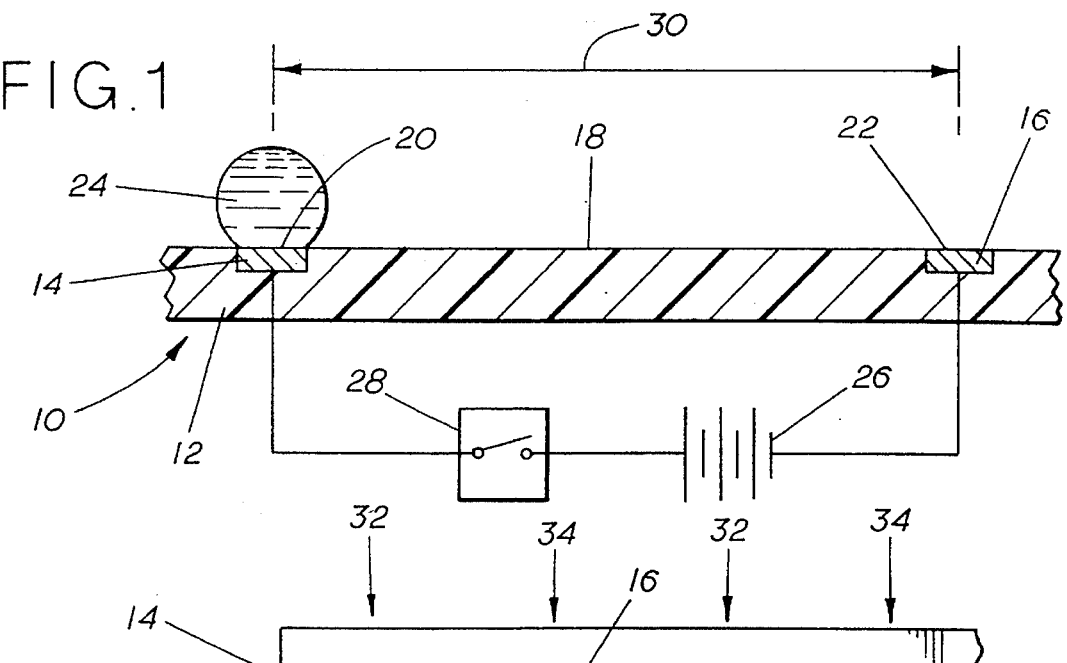
FIG. 1 is a partial section view of the preferred embodiment of the apparatus of the present invention, showing the electrical connection schematically.

The present invention replaces the previously known configuration of aqueous solution sample vessels with an array of nanovolume droplets of the aqueous solution on a sample substrate. The placing of the sample solution on the substrate, moving of the solution from one point to another point on the substrate, and picking up of the solution from the substrate will take the form of manipulation of the droplets by a unique method of electrostatically controlling each individual droplet. The electrostatic force on an electrically charged droplet is utilized to manipulate the droplet with an electrostatic field.

In order to understand the present invention, it is helpful to understand the forces that act on a charged droplet of liquid. An electrostatically charged liquid droplet on a surface of a solid is under the influence of gravitational force, surface tension, electrostatic force, and adhesive force. For a small nanovolume droplet, the gravitational force is much smaller than the other forces and can be neglected. The electrostatic force on an uncharged droplet, caused only by the dielectric properties of the droplet, results from the gradient of the electric field across the diameter of the droplet. For a small diameter droplet, the electrostatic force required to move the droplet would require an impractically large electric field gradient. Therefore, it is advisable to charge the droplet and utilize the electrostatic force which can be applied to an electrically charged droplet.

In an aqueous solution, the droplet under consideration contains electrolytes, and the ions in the solution are mobile. When the droplet is electrically charged, an electrostatic repulsive force will drive the ions to the surface of the droplet, until the electrostatic force is balanced by the pressure of the ions. Therefore, the electrostatic charge is concentrated within the Debye length $\lambda_D$ of the surface, where:

$$\lambda_D = \left( \frac{\epsilon kT}{e^2 n_i} \right)^{1/2}$$

In this equation, $\epsilon$ is the dielectric constant of the solution, T is the temperature, and $n_i$ is the number density of the ions.

Consider a droplet of the radius a, with the total charge Q. The charge density q near the surface is given by $$q = Q/(4\pi a^2 \lambda_D).$$

If we assume that there are no other ions, we obtain $$q = \left( \frac{Q}{4\pi a^2} \right)^2 \left( \frac{e}{\epsilon kT} \right).$$

The average charge density q sub ave throughout the droplet is given by $$\bar{q} = \left( \frac{3Q}{4\pi a^3} \right),$$

and the ratio of surface charge density to total charge density is given by $$q/\bar{q} = \left( \frac{Q}{12\pi a} \right) \left( \frac{e}{\epsilon kT} \right).$$

As a result, the surface of the droplet will experience an outward pressure $p_{out}$ caused by electrostatic repulsion between ions, where $$P_{out} = \frac{1}{2} \frac{Q}{4\pi \epsilon a^2} \frac{Q}{4\pi a^2}.$$

An inward pressure $p_{in}$ is caused by surface tension $\Gamma$, where $$P_{in} = 2\Gamma/a.$$

In order for Rayleigh's criterion to be met, where the droplet will maintain its integrity, the total charge on the droplet is limited by $$Q < 8\pi \sqrt{\epsilon \Gamma} \ a^{3/2}.$$

The electrostatic potential V of an isolated droplet with total charge Q is given by $$V = \frac{Q}{4\pi \epsilon_0 a}.$$

When the droplet is charged by a small electrode in contact with the droplet, rather than having the droplet isolated, the above relationship still approximates the electrostatic potential. The potential, or voltage, is between the electrode in contact with the droplet and an electrode separated from the droplet. This charges the droplet capacitively. Charging an aqueous droplet by contact with an electrode will likely produce H⁻ or OH⁻, so the change in pH must be considered. The presence of salts and buffers should also be addressed.

When a droplet comes in contact with a surface, there is an adhesive force between them. This force must be overcome in order to remove the droplet from the surface. The strength of the force is related to the heat of immersion of the given solid in the given liquid. The adhesive force between a droplet of an aqueous solution and a typical electrode material can be estimated by dividing the applicable heat of immersion by the bond length of the hydrogen bond. The typical adhesive force is relatively high.

If a force is applied to the droplet in an attempt to pull the droplet off the surface, the adhesive force must be exceeded before the droplet can be removed. However, the tensile strength of water is in a range well below the adhesive force holding the droplet on the surface. Therefore, as the force is applied, the droplet will elongate and pinch off, leaving a small amount of water still adhering to the surface. When the original sample is a nanovolume droplet, leaving sample material on the surface is highly undesirable. In order to avoid leaving aqueous sample material on the surface when the droplet is moved, or minimize the loss, the present invention will peel or roll the droplet off the surface, rather than tearing it off.

Referring now to FIG. 1, the apparatus 10 of the present invention includes a substrate 12 of a non-wettable material. Disc shaped electrodes 14, 16 are imbedded into substrate 12, with wettable upper electrode surfaces 20, 22 flush with non-wettable upper surface 18 of substrate 12. Each electrode is made of a water wettable material which is also electrically conductive. The material is preferably a metal, such as Ag or AgCl. Electrodes 14, 16 preferably have radii of approximately 10 μm, but larger or smaller electrodes could easily be used. Electrodes 14, 16 are preferably centered approximately 100 μm apart, but different spacing could be adopted.

Droplet 24 is placed on electrode 14, which can therefore be referred to as a positioning electrode, since it establishes the initial position of droplet 24 prior to movement of droplet 24. Electrode 16 is the electrode to which droplet 24 will be attracted in practicing the method of the present invention, so it can be referred to as the attraction electrode. As will be shown later, after droplet 24 is moved to attraction electrode 16, electrode 16 becomes the new positioning electrode for further movement of droplet 24 to yet another electrode.

A voltage source 26 is connected between electrodes 14, 16. A switch or other controller 28 is connected in the circuit to control the application of voltage to electrodes 14, 16. A simple controller 28 and voltage source 26 are shown for the sake of simplicity, but it is to be understood that these represent a variety of voltage application and control means well known in the art, ranging from the very simple to the very complex, including computer controlled systems which can vary the polarity and magnitude of the voltage.

Before the voltage is turned on, droplet 24 is stable, because substrate 12 is made of a non-wettable material. When the voltage is applied, droplet 24 begins to be charged capacitively. By assuming that droplet 24 is round, and treating droplet 24 as an isolated droplet, the charge Q is approximated by $$Q \sim 4\pi\epsilon_0 aV.$$

The electrostatic force $F_{es}$ drawing droplet 24 toward electrode 16 is given by $$F_{es} = QV/l - 4\pi\epsilon_0(a/l)V^2,$$

where l is the distance between electrodes 14, 16.

The adhesion force $F_a$ resisting the electrostatic force is a function of the heat of immersion and the contact area between droplet 24 and electrode 14. If droplet 24 breaks, leaving a thin film of water on the adhesive surface, the limit of the effective resistance against movement of droplet 24 is the tensile strength of water. Therefore, this is theoretically the limit of electrostatic force that can be applied to move droplet 24, without breaking it. Force $F_a$ can be approximated by substituting the surface tension $\Gamma$ for the heat of immersion, yielding $$F_a \sim \frac{\pi b}{2} \Gamma,$$

where b is the radius of electrode 14. This still exceeds the tensile strength of water, and breaking of droplet 24 would theoretically result. The voltage necessary to apply this force can be approximated by $$V \sim \left(\frac{bl\Gamma}{8\epsilon_0 a}\right)^{1/2}.$$

In order to move droplet 24 without breaking it, the present invention will apply a much smaller voltage, resulting in application of an electrostatic force much lower than the tensile strength of water. Movement of droplet 24 will be promoted by application of this electrostatic force so as to peel or roll droplet 24 off of surface 20 of positioning electrode 14. During the electrostatic charging of droplet 24, gas bubbles may develop at the surface of positioning electrode 14, effectively reducing the contact area between droplet 24 and electrode 14, further reducing the force required to move droplet 24.

Experimental tests have determined that the voltage necessary to move a nanovolume droplet from a positioning electrode of approximately 10 μm diameter, to an attraction electrode approximately 100 μm away is on the order of 10 volts. The necessary voltage for movement of a useful range of droplet sizes according to the present invention could range from a low end on the order of 0.1 volt to a high end on the order of 1000 volts.

When droplet 24 arrives at attraction electrode 16, the electric charge of droplet 24 is discharged and begins to be charged with the opposite polarity. The voltage can be turned off at this point, until the next movement of droplet 24 is required, when the process will be repeated, with electrode 16 as the new positioning electrode.

Figure 2:
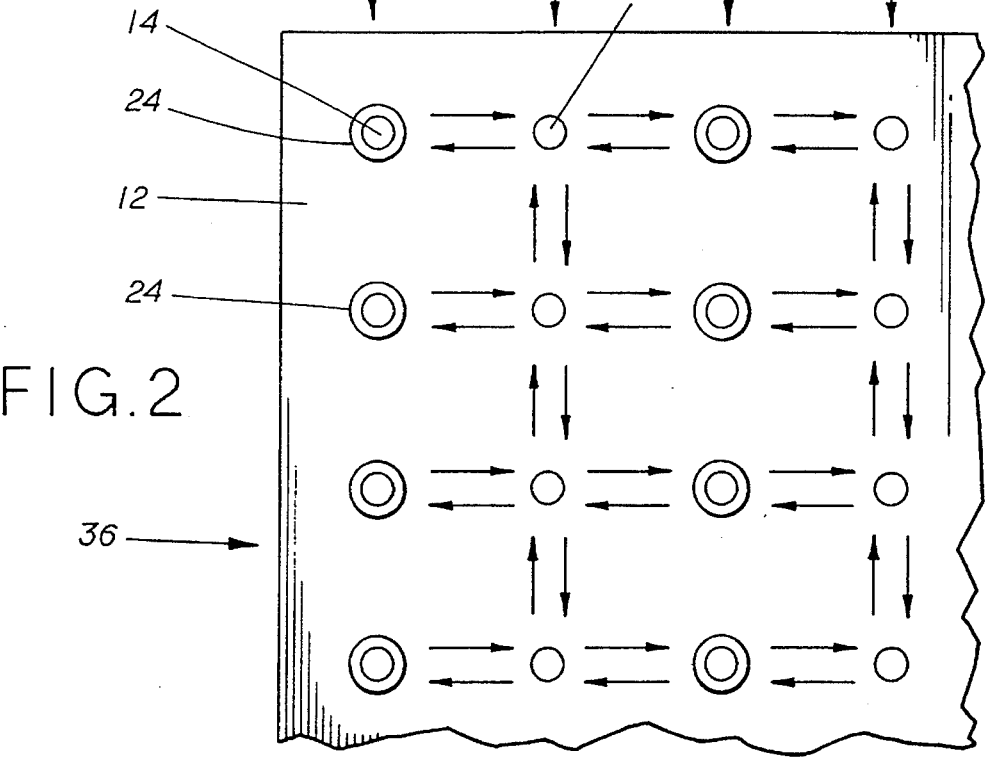
FIG. 2 is a plan view of the apparatus shown in FIG. 1.

An array of electrodes 14, 16 can be placed on substrate 12 in a pattern as shown in FIG. 2, or in any other desired pattern, according to the needs of the analysis to be performed, or to conform to the needs of automated equipment for positioning of substrate 12 or positioning of related access equipment. The initial dispensing of droplets 24 can be as desired, and they can be picked up as desired. Equipment for dispensing and picking up droplets 24, using the method described above, will be described below. If desired, every other column 32 can be used for initial positioning of droplets 24, and other rows or columns 34, 36 may be used as transport alleys. The arrows indicate possible pathways of droplets 24.

Figure 3:
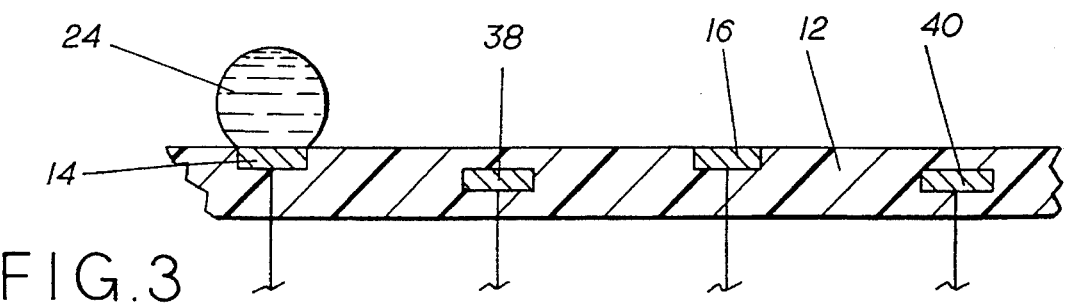
FIG. 3 is a partial section view of an alternate embodiment of the apparatus of the present invention.

Referring now to FIG. 3, non-wettable control electrodes 38, 40 can be placed between wettable electrodes 14, 16, or elsewhere as required for the planned movement of droplet 24. Control electrodes 38, 40 can be buried in substrate 12 as shown, or they can be made with a non-wettable upper surface. They may be effective in controlling the motion of droplet 24, for example preventing the droplet from overshooting attraction electrode 16 by decelerating droplet 24 as it approaches attraction electrode 16. Similarly, control electrodes 38, 40 can be positioned and energized as required to guide or otherwise control the movement of droplet 24 in addition to acceleration or deceleration.

Figure 4:
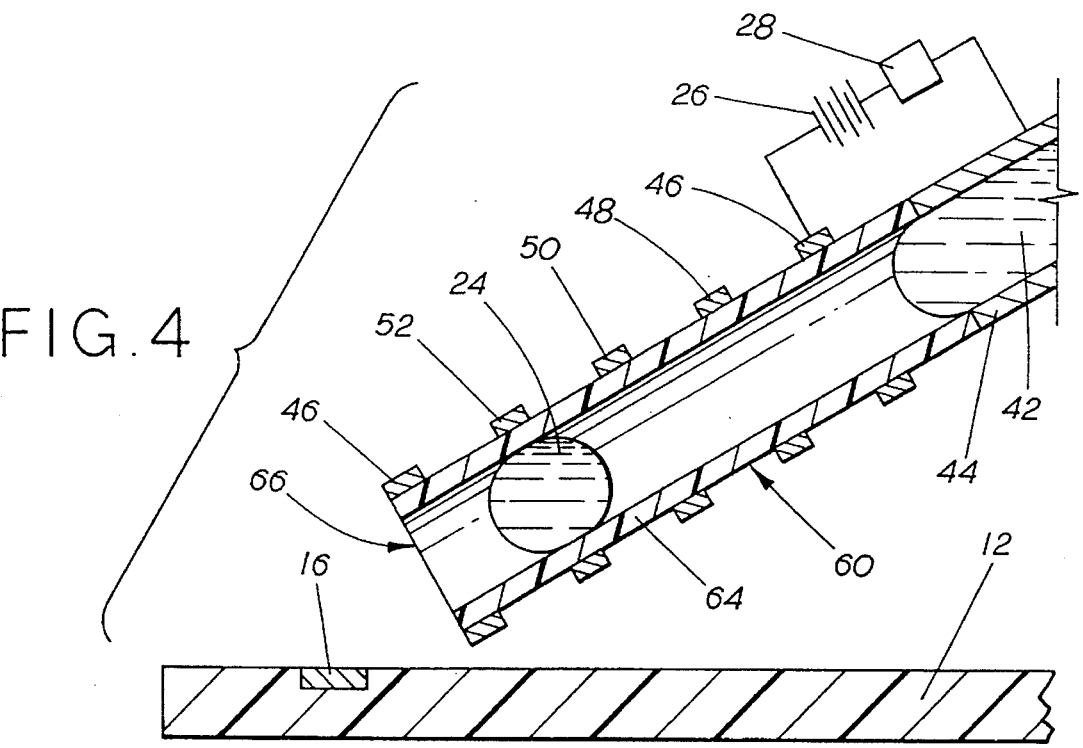
FIG. 4 is a partial section view of the portable droplet dispensing implement of the present invention, showing its interaction with the apparatus shown in FIG. 1.

The dispensing of droplets 24 to substrate 12 can be done by direct application of the liquid in bulk, by spray, or by a portable dispensing implement such as electrostatic pipette 60, as shown in FIG. 4. Pipette 60 consists of hollow non-wettable tube 64, with tubular wettable primary electrode 44 exposed to a source of the sample liquid 42. Primary electrode 44 performs much the same function in the method of the present invention as the positioning electrode 14 discussed above. Annular non-wettable secondary electrodes 46, 48, 50, 52 are spaced axially along tube 64 from primary electrode 44. Secondary electrodes 46, 48, 50, 52 perform much the same function as control electrodes 38, 40 discussed above. As many secondary electrodes as desired can be used.

The sample liquid is brought into primary electrode 44 in tube 64, via a capillary action. Voltage is sequentially applied between primary electrode 44 and secondary electrodes 46, 48, 50, 52 along tube 64, by voltage source 26 and control means 28. For simplicity, electrical connections with all of the secondary electrodes are not shown. Control means 28 can be a computer control means, or microprocessor, of several types well known in the art. A portion of sample liquid 42 is electrostatically charged by primary electrode 44, then attracted in the form of charged droplet 24 to secondary electrode 46. The polarity and magnitude of the voltages applied to secondary electrodes 46, 48, 50, 52 are sequentially controlled by control means 28 so that droplet 24 will follow a zone of opposite polarity down tube 64 toward open end 66.

Figure 5:
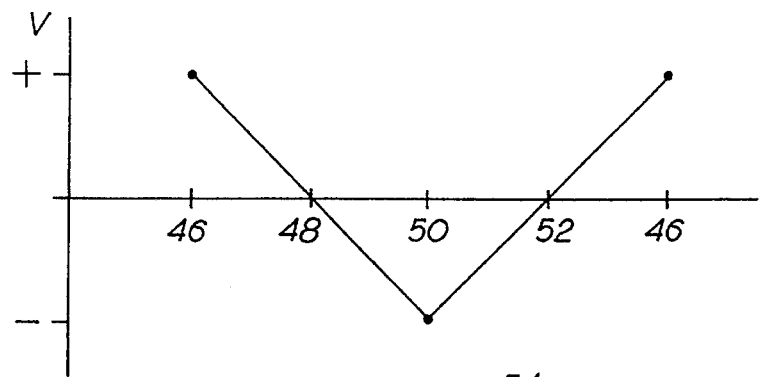
FIG. 5 a graph of voltage versus axial position along the implement shown in FIG. 4.

Electrodes 46, 48, 50, 52, and any additional secondary electrodes required, are placed at regular intervals along tube 64. Assuming a positive charge on droplet 24, FIG. 5 shows the voltages on the secondary electrodes when droplet 24 is adjacent to electrode 50. In the scheme shown here, every fourth electrode has the same voltage. A positively charged droplet 24 is stable at electrode 50. By moving the voltage pattern along tube 64, droplet 24 will be transported stably.

Dispensing implement 60 can be maneuvered by known precision means to locate open end 66 adjacent to a target electrode on substrate 12. At open end 66, droplet 24 will be dispensed onto a target electrode such as an attraction electrode 16, on substrate 12. The process for dispensing droplet 24 thusly is essentially as described above, with a secondary electrode functioning as the positioning electrode and a target electrode on substrate 12 functioning as the attraction electrode.

Figure 6:
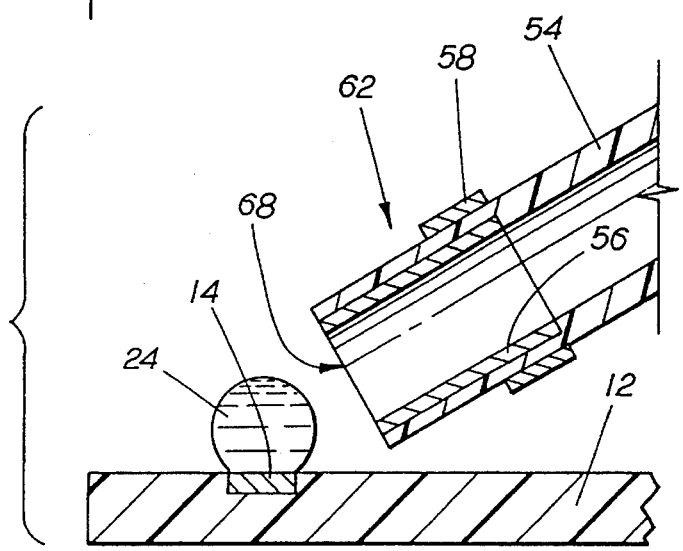
FIG. 6 is a partial section view of the portable pickup tool of the present invention, showing its interaction with the apparatus shown in FIG. 1.

There may be a need to pick up droplet 24 from substrate 12o A portable pickup tool 62 is shown in FIG. 6. Pickup tool 62 consists of a non-wettable tube 54, having a diameter approximately equal to the diameter of droplet 24, and a wettable interior portion 56 at the open end of tube 54. Wettable portion 56 is an electrically insulating and hydrophilic insert such as an oxide ceramic, for example. An annular electrode 58 is placed outside of tube 54 near open end 68. Portable pickup tool 62 can be maneuvered by known precision means to locate open end 68 adjacent to droplet 24 on substrate 12. When a voltage is applied between electrode 58 and electrode 14, the droplet is transferred into the pickup tool 62. Capillary adhesion between droplet 24 and wettable portion 56 will hold droplet 24 while pickup tool 62 is being moved away from substrate 12.

While the particular METHOD AND APPARATUS FOR ELECTROSTATIC MANIPULATION OF DROPLETS as herein shown and disclosed in detail are fully capable of obtaining the objects and providing the advantages herein before stated, it is to be understood that they are merely illustrative of the presently preferred embodiments of the invention and that no limitations are intended to the details of the method, construction or design herein shown other than as described in the appended claims.

I claim:

1. A device for manipulation of liquid droplets, comprising:

a positioning means for establishing an initial position of an individual liquid droplet, said positioning means being electrically conductive;

an attraction means adjacent to said positioning means for electrostatically attracting a droplet from said positioning means; and a voltage application means for applying a first voltage to said positioning means, thereby electrostatically charging the droplet, then raising said first voltage to a higher magnitude and applying a second voltage of opposite polarity to said attraction means to generate a force urging the droplet from said positioning means toward said attraction means;

wherein:

said positioning means and said attraction means comprise first and second electrodes, respectively;

said first and second electrodes comprise wettable surfaces exposed to the droplet; and said first and second electrodes are surrounded by a non-wettable surface.

2. A device as claimed in claim 1, wherein:

said first electrode is initially occupied by a droplet;

said second electrode is not initially occupied by a droplet; and said voltage application means relocates the droplet from said first electrode to said second electrode.

3. A device as claimed in claim 1, wherein:

said first electrode is initially occupied by a droplet;

said second electrode is initially occupied by a droplet; and said voltage application means mixes the two droplets.

4. A device for manipulation of liquid droplets, comprising:

a non-wettable substrate for supporting a plurality of liquid droplets;

a plurality of wettable electrodes mountable on said substrate;

a voltage source for applying voltage to said wettable electrodes; and a controller for selectively controlling the polarity and magnitude of said voltage applied to each of said wettable electrodes to first electrically charge each of the droplets at one of said wettable electrodes and then electrostatically attract each of the droplets to another of said wettable electrodes.

5. A device as claimed in claim 4, further comprising a plurality of non-wettable electrodes for electrostatically controlling movement of the droplet between said wettable electrodes, said non-wettable electrodes being subjected to voltage of selected polarity and magnitude by said controller to generate forces on the droplet for control of speed and direction.

6. A device as claimed in claim 4, wherein:

a first set of said plurality of wettable electrodes are initially occupied by droplets;

a second set of said plurality of wettable electrodes are initially unoccupied by droplets; and said controller relocates a droplet from one of said wettable electrodes in said first set to one of said wettable electrodes in said second set.

7. A device as claimed in claim 4, wherein:

a first set of said plurality of wettable electrodes are initially occupied by droplets;

a second set of said plurality of wettable electrodes are initially occupied by droplets; and said controller mixes a droplet from one of said wettable electrodes in said first set with a droplet on one of said wettable electrodes in said second set.

* * * * *